US012522957B2

(12) United States Patent
Costa et al.

(10) Patent No.: US 12,522,957 B2
(45) Date of Patent: Jan. 13, 2026

(54) BASIC FABRIC FOR AN ADHERED FABRIC OF A HIGH-PERFORMANCE BELT AND PROCESS FOR THE MANUFACTURE THEREOF

(71) Applicants: COSTA S.R.L., Podenzano (IT); TESSITURA MARINONI S.R.L., Cislago (IT)

(72) Inventors: Giuliano Costa, Podenzano (IT); Fabio Danilo Marinoni, Cislago (IT); Giovanni Mazzucco, Cislago (IT)

(73) Assignees: COSTA S.R.L., Podenzano (IT); TESSITURA MARINONI S.R.L., GALLARATE (IT)

( * ) Notice: Subject to any disclaimer, the term of this patent is extended or adjusted under 35 U.S.C. 154(b) by 212 days.

(21) Appl. No.: 18/287,044

(22) PCT Filed: Apr. 21, 2022

(86) PCT No.: PCT/IB2022/053741
§ 371 (c)(1),
(2) Date: Oct. 16, 2023

(87) PCT Pub. No.: WO2022/224192
PCT Pub. Date: Oct. 27, 2022

(65) Prior Publication Data

US 2024/0200239 A1 Jun. 20, 2024

(30) Foreign Application Priority Data

Apr. 23, 2021 (IT) ........................ 102021000010394

(51) Int. Cl.
*D03D 1/00* (2006.01)
*D03D 13/00* (2006.01)
(Continued)

(52) U.S. Cl.
CPC ......... *D03D 1/0094* (2013.01); *D03D 13/004* (2013.01); *D03D 15/47* (2021.01); *D03D 15/49* (2021.01); *D03D 15/56* (2021.01); *F16G 1/16* (2013.01); *D10B 2401/06* (2013.01); *D10B 2505/02* (2013.01)

(58) Field of Classification Search
None
See application file for complete search history.

(56) References Cited

U.S. PATENT DOCUMENTS

2011/0003659 A1 1/2011 Wu et al.

FOREIGN PATENT DOCUMENTS

DE 69403274 T2 8/1997
EP 1643157 A1 4/2006
(Continued)

OTHER PUBLICATIONS

International Search Report, issued in PCT/IB2022/053741, mailed Sep. 27, 2022, Rijswijk, NL.

*Primary Examiner* — Arti Singh-Pandey
(74) *Attorney, Agent, or Firm* — ArentFox Schiff LLP; Michael Fainberg

(57) ABSTRACT

A basic fabric for an adhered fabric of a transmission belt, provided with an upper face and a lower face and having warp yarns in a longitudinal direction and weft yarns in a transverse direction is provided. The warp yarns have a predefined degree of elasticity and the weft yarns have a lower elasticity than the warp yarns. The weave of the basic fabric is Inverted Batavia weave.

13 Claims, 4 Drawing Sheets

(51) Int. Cl.

| | |
|---|---|
| ***D03D 15/47*** | (2021.01) |
| ***D03D 15/49*** | (2021.01) |
| ***D03D 15/56*** | (2021.01) |
| ***F16G 1/16*** | (2006.01) |

(56) References Cited

FOREIGN PATENT DOCUMENTS

| | | | |
|---|---|---|---|
| JP | 2006316881 | A | 11/2006 |
| WO | 2019118081 | A1 | 6/2019 |
| WO | 2021186339 | A1 | 9/2021 |

BASIC FABRIC FOR AN ADHERED FABRIC OF A HIGH-PERFORMANCE BELT AND PROCESS FOR THE MANUFACTURE THEREOF

CROSS-REFERENCE TO RELATED APPLICATIONS

This application is a National Phase Application of PCT International Application No. PCT/IB2022/053741, having an International Filing Date of Apr. 21, 2022 which claims priority to Italian Application No. 102021000010394 filed Apr. 23, 2021, each of which is hereby incorporated by reference in its entirety.

FIELD OF THE INVENTION

The present invention relates to the field of high-performance and high-reliability belts, used in countless technical sectors, such as for example in the automotive sector, and in general in industrial sectors such as the construction of machine tools and the transport sector, such as for example power transmission belts, tangential flat belts and the like. In particular, the present invention relates to the field of belts consisting of a matrix, a core incorporated in the matrix and an adhered fabric which covers at least some areas of the belt, such as for example the teeth or the back.

The adhered fabric consists of a raw fabric incorporated in a matrix of polymeric materials and the raw fabric in turn comes from a basic fabric, typically obtained in a flat loom.

The present invention relates to an innovative basic fabric and to a process for manufacturing the basic fabric.

PRIOR ART

Currently, the basic fabric consists of warp yarns in the longitudinal direction, substantially rigid, and weft yarns in the transverse direction, orthogonal to the longitudinal direction, substantially elastic. The weave of such basic fabric, i.e. the mutual arrangement of the weft and warp yarns, is typically of the 2:2 twill type (FIG. 4), which overall creates a typical diagonal pattern on the basic fabric.

Recently, an innovative process for the production of an adhered fabric has been developed, in which the basic fabric comprises substantially elastic warp yarns and substantially rigid weft yarns. Such process is the subject of the International Application WO-A1-2021/186339, on behalf of one of the Applicants.

However, the Applicants have found that a basic fabric with elastic warp yarns and rigid weft yarns and 2:2 twill weave exhibits numerous drawbacks, such as for example an uneven distribution of the tensions and deformations within the fabric, which are usually due to a reduction in the belt performance.

OBJECT OF THE INVENTION

The object of the present invention is to at least partially overcome the aforementioned drawbacks by manufacturing a basic fabric which ensures a sufficiently uniform distribution of internal tensions and deformations.

Such object is achieved by a basic fabric as described and claimed herein. Additional advantageous embodiments of the present invention are also described.

BRIEF DESCRIPTION OF THE FIGURES

The features and the advantages of the basic fabric according to the present invention will appear more clearly from the following description, made by way of an indicative and non-limiting example with reference to the drawings of the accompanying figures, in which.

DETAILED DESCRIPTION

According to the present invention, a basic fabric 1 comprises warp yarns 2 in the longitudinal direction and weft yarns 4 in the transverse direction, orthogonal to the longitudinal one. For example, the basic fabric 1 is manufactured using a flat loom, so as to obtain a piece of basic fabric having a weft width W, preferably equal to the width H available for a mold of a belt or multiples thereof, and a warp length L.

The warp yarns 2 have a greater elasticity than the weft yarns 4. In particular, the warp yarns 2 have a high elasticity, while the weft yarns 4 are substantially rigid with respect to the warp yarns.

For example, a fabric specimen having a width of 25 millimeters, subjected to a traction of 100 N in the direction of the warp, exhibits a percentage elongation between 15-50 times the percentage elongation of the specimen when subjected to the same traction in the direction of the weft.

Furthermore, the fabric has a percentage elongation at break in the warp direction of between 150%-250%, a percentage elongation in the warp direction under an action of 20 N of between 60%-140% and a strength for a percentage elongation in the warp direction of 50% less than 4 N.

Advantageously, by virtue of these features, the fabric is easily workable.

According to an embodiment of a fabric, each warp yarn 2 comprises one or more textured yarns; according to a further embodiment of the fabric, each warp yarn 2 comprises one or more parallel yarns; according to a still further embodiment of the fabric, each warp yarn 2 comprises one or more twisted yarns; according to an embodiment of the fabric, each warp yarn 2 comprises one or more taslanized yarns.

Figure 1:
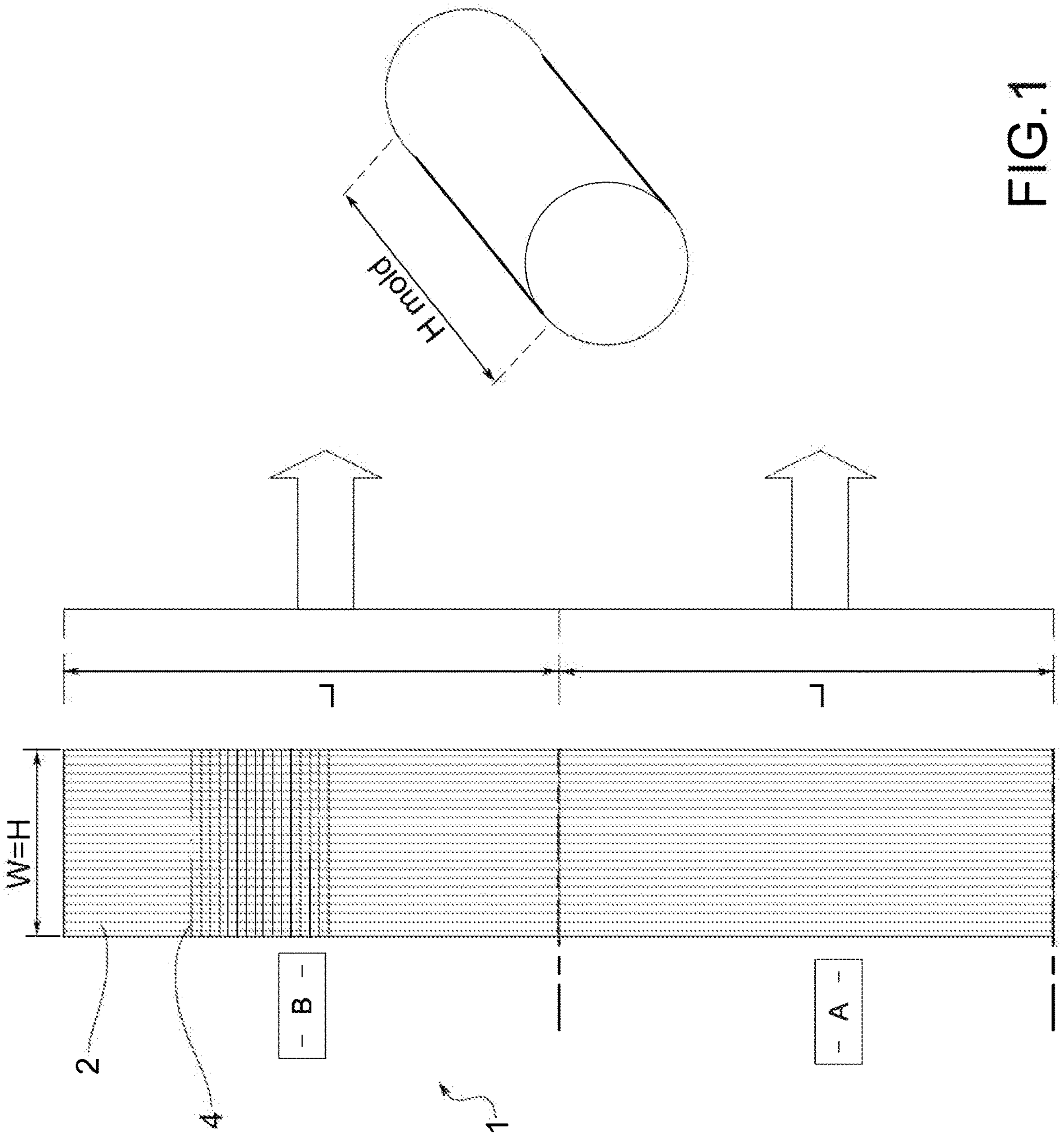
FIG. 1 shows a diagram of a process for manufacturing a belt, according to an embodiment of the present invention.
Figure 2:
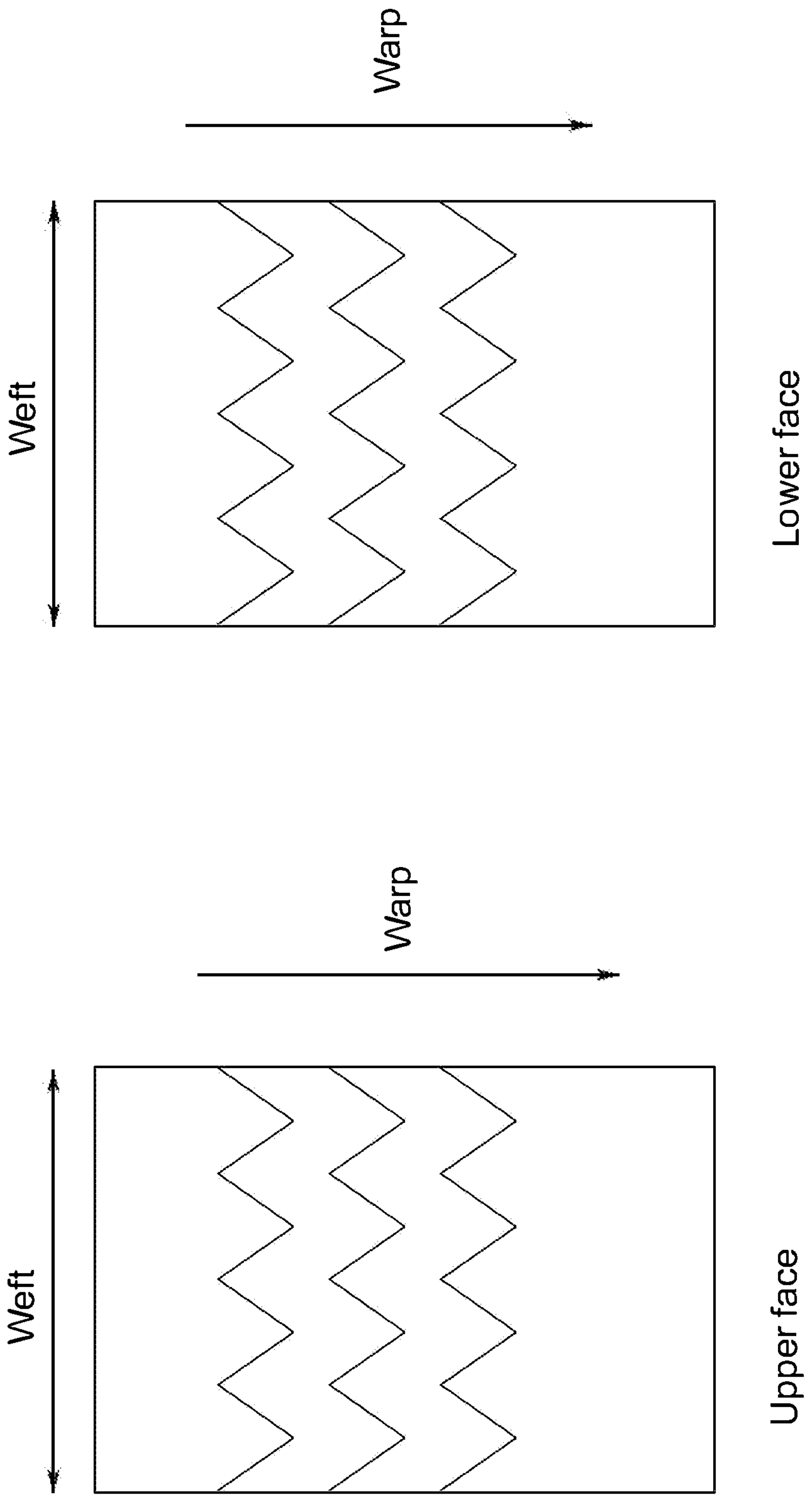
FIG. 2 schematically shows the upper face and the lower face of a basic fabric according to an embodiment of the present invention.

The basic fabric 1 has an upper face and an opposite lower face. The weave of the basic fabric, i.e. the mutual arrangement of the warp yarns and the weft yarns, is such that the pattern on the upper face is identical to the pattern on the lower face (FIG. 2).

Advantageously, this facilitates, among other things, the use of the fabric in the subsequent steps of the belt manufacturing process. In fact, a different pattern between one face and the other (as in the embodiments of the prior art, in 2:2 Twill) requires special attention by the operators in the junctions of different pieces of the fabric, for example in long belts or in the recovery of non-optimized pieces.

Figure 3A:
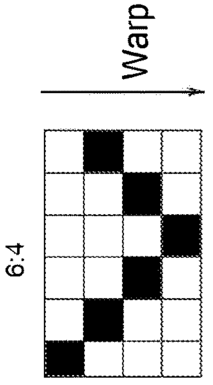
FIGS. 3*a* and 3*b* schematically show the drawing-in of the basic fabric according to embodiments of the present invention.
Figure 3B:
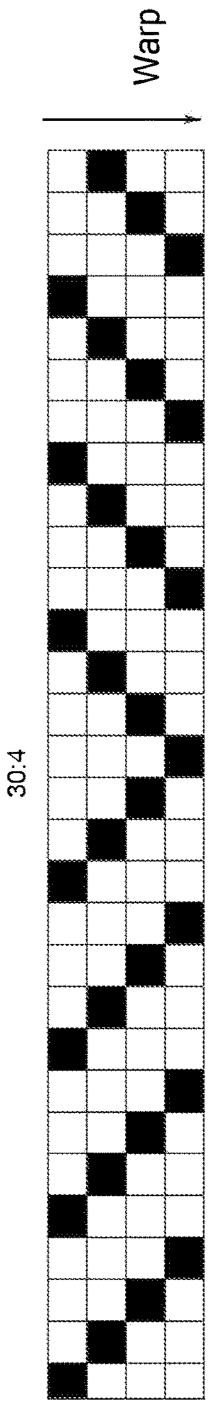

In particular, according to the invention, the weave of the basic fabric is of the Inverted Batavia type, with a weave ratio preferably of from 6:4 to 180:4 (FIG. 3*a* schematically indicates the drawing-in to obtain a 6:4 ratio; FIG. 3*b* schematically indicates the drawing-in to obtain a 30:4 ratio; for higher ratios, up to 180:4, the scheme and logic of FIG. 3*b* are maintained).

Advantageously, the Inverted Batavia weave ensures the necessary orthogonality to the fabric, which, as the Applicants have verified, has a direct impact on the quality and uniformity of performance of the belt.

Figure 5:
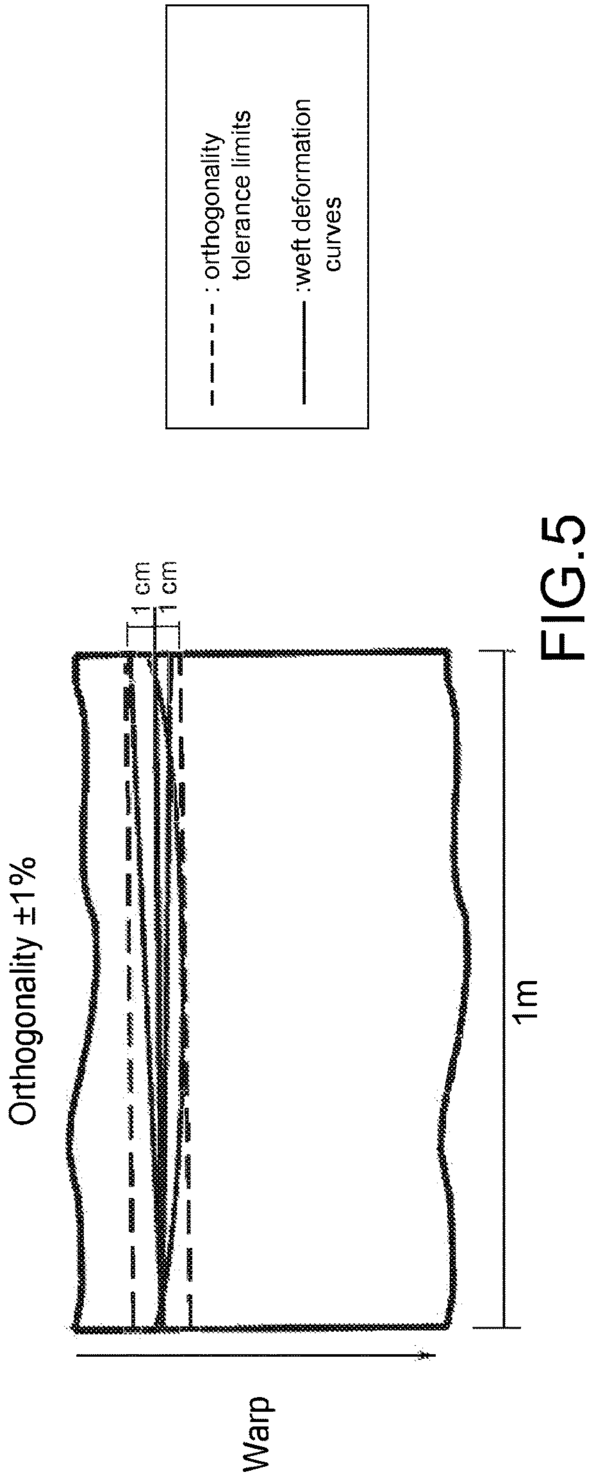
FIG. 5 schematically shows the orthogonality of a fabric.
Figure 4:
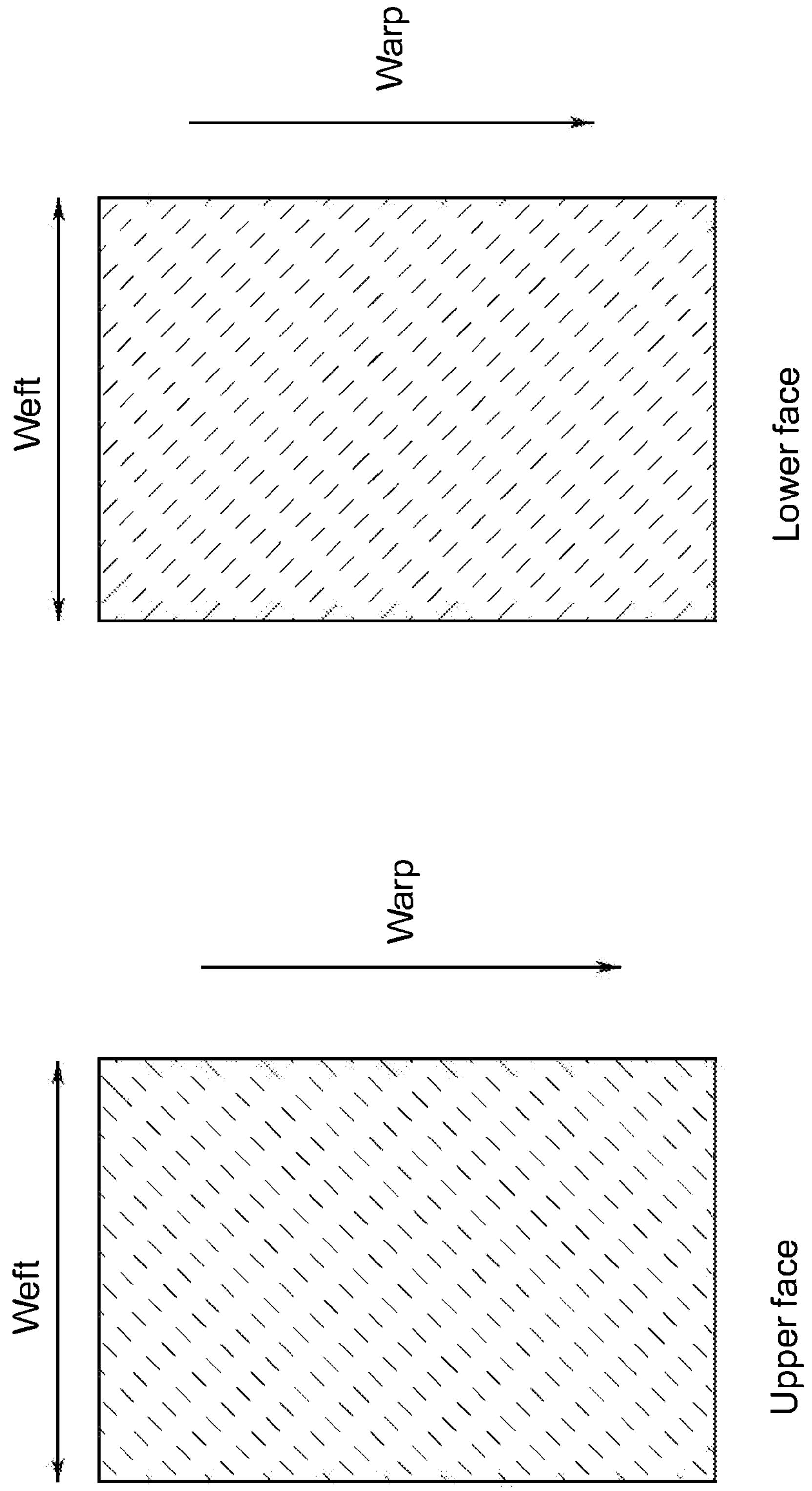
FIG. 4 schematically shows the upper face and the lower face of a basic fabric of the prior art, with a 2:2 twill weave, which is not the object of the present invention.

In general, if the orthogonality of a fabric is less than X %, it means that for that fabric, 1 meter wide, a weft yarn deviates by less than X centimeters from the ideal condition of perfect orthogonality to the warp; FIG. 5 illustrates such parameter.

The Applicants have found that, advantageously, a fabric according to the invention, wherein the warp is more elastic than the weft, having an Inverted Batavia type weave, the orthogonality of the fabric is <1%; in the solutions of the prior art, on the other hand, wherein the fabric has a more elastic weft than the warp, and a different weave, the orthogonality is between 2%-3%.

Within the range of the weave ratios mentioned above, the selection is made according to the belt to be obtained; for example, the selection may be made in order to optimize the final result, for example according to the most frequent width of the belts to be manufactured.

The basic fabric is subsequently used to manufacture an adhered fabric, wherein the warp yarns and the weft yarns are covered with a covering consisting of solidified polymeric materials. The adhered fabric is finally used to manufacture parts of a belt, for example the back or the outer surface of the teeth or the sides.

Innovatively, the weave according to the invention allows high performance of the belt to be obtained, by virtue of a high uniformity of the distribution of tensions and deformations within the fabric, due to the maintenance of an accentuated orthogonality between the weft yarns and the warp yarns.

For example, the Applicants have found that the belts manufactured with a basic fabric according to the present invention allow an increase in the useful life of more than 50% compared to the belts of the prior art and an overall improvement in reliability of about 30%.

Furthermore, advantageously, for the manufacture of very long belts, for which it is necessary to join several pieces of basic fabric, the identicalness between the upper face and the lower face helps the operators, who do not have to pay special attention in joining such pieces.

It is clear that those skilled in the art may make changes to the basic fabric and to the process described above in order to meet incidental needs, all falling within the scope of protection defined in the following claims.

The invention claimed is:

1. A basic fabric for an adhered fabric of a high-performance belt, having an upper face and a lower face, and comprising warp yarns in a longitudinal direction and weft yarns in a transverse direction, orthogonal to the longitudinal direction, wherein the warp yarns have a predefined elasticity and the weft yarns have less elasticity than the warp yarns, wherein a weave of the basic fabric is such that the warp yarns and the weft yarns form a pattern on the upper face identical to a pattern on the lower face, and wherein the weave is Inverted Batavia weave.

2. The basic fabric of claim 1, wherein the Inverted Batavia weave has a weave ratio of from 6:4 to 180:4.

3. The basic fabric of claim 1, wherein, considering a 25 mm wide specimen, a percentage elongation in a warp direction is between 15 and 50 times the percentage elongation in a weft direction, when the 25 mm wide specimen is subjected to a force of 100 N.

4. The basic fabric of claim 1, wherein each warp yarn comprises one or more parallel yarns.

5. The basic fabric of claim 1, wherein each warp yarn comprises one or more twisted yarns.

6. The basic fabric of claim 1, wherein each warp yarn comprises one or more textured yarns.

7. The basic fabric of claim 1, wherein each warp yarn comprises one or more taslanized yarns.

8. The basic fabric of claim 1, wherein each warp yarn comprises a yarn core having an elastic yarn, and a yarn complement having in turn one or more yarns, either parallel, twisted, textured, or taslanized, and wherein the yarn complement wraps said yarn core along its extension.

9. An adhered fabric for a high-performance belt, comprising a basic fabric according to claim 1, wherein the basic fabric is incorporated in a matrix of polymeric materials.

10. A high-performance belt comprising an adhered fabric according to claim 9.

11. A process for manufacturing a basic fabric for an adhered fabric of a high-performance belt, the process comprising:

providing warp yarns having a predefined degree of elasticity and providing weft yarns having a lower elasticity than the warp yarns;

producing by weaving the basic fabric comprising the warp yarns in a longitudinal direction and the weft yarns in a transverse direction, orthogonal to the longitudinal direction, with a weave of the basic fabric such that the warp yarns and the and weft yarns form a pattern on an upper face of the basic fabric identical to a pattern on a lower face of the basic fabric, wherein said weave is Inverted Batavia weave.

12. The process of claim 11, wherein the Inverted Batavia weave has a weave ratio of from 6:4 to 180:4.

13. The process of claim 11, wherein, considering a 25 mm wide specimen, a percentage elongation in a warp direction is between 15 and 50 times the percentage elongation in a weft direction, when the 25 mm wide specimen is subjected to a force of 100 N.

* * * * *